(12) United States Patent
Jones et al.

(10) Patent No.: US 6,282,354 B1
(45) Date of Patent: *Aug. 28, 2001

(54) LOW ATTENUATION OPTICAL WAVEGUIDE

(75) Inventors: Peter C. Jones; Daiping Ma; David K. Smith, all of Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/641,019

(22) Filed: Aug. 17, 2000

Related U.S. Application Data

(63) Continuation of application No. 09/145,755, filed on Sep. 2, 1998, now Pat. No. 6,134,367.
(60) Provisional application No. 60/058,774, filed on Sep. 12, 1997.

(51) Int. Cl.⁷ ....................................................... G02B 6/18
(52) U.S. Cl. ......................... 385/124; 385/127; 385/126; 385/123
(58) Field of Search ..................................... 385/122–128

(56) References Cited

U.S. PATENT DOCUMENTS

| | | | |
|---|---|---|---|
| 5,721,800 | 2/1998 | Kato et al. | 385/127 |
| 5,852,701 | 12/1998 | Kato et al. | 385/127 |
| 6,072,929 | 6/2000 | Kato et al. | 385/123 |
| 6,134,367 | * 10/2000 | Jones et al. | 385/124 |

* cited by examiner

*Primary Examiner*—Phan T. H. Palmer
(74) *Attorney, Agent, or Firm*—William J. Chervenak

(57) ABSTRACT

Disclosed is a single mode optical waveguide fiber having a core refractive index profile in which the profile parameters are selected to provide an attenuation minimum. A set of profiles having the same general shape and dimensions is shown to have a group of profiles contained in a sub-set which exhibit a minimum of attenuation as compared to the remaining members of the set. The members of the sub-set have been found to have the lowest effective group index, $n_{geff}$, and the lowest change in $\beta^2$ under waveguide fiber bending.

8 Claims, 2 Drawing Sheets

LOW ATTENUATION OPTICAL WAVEGUIDE

This application is based upon the provisional application Ser. No. 60/058,774, filed Sep. 12, 1997, which we claim as the priority date of this application.

BACKGROUND OF THE INVENTION

The invention relates to an optical waveguide fiber optimized for low attenuation. In particular, waveguide fiber attenuation is minimized for any core refractive index profile by proper selection of the core refractive index profile variables.

The dependence of waveguide properties upon the configuration of the refractive index profile has been described in the pioneering patent, U.S. Pat. No. 4,715,679, Bhagavatula. In that patent, core refractive index profiles are disclosed which provide for a variety of waveguide fiber properties, especially those having a zero dispersion wavelength shifted into the 1550 nm operating window and those which have a relatively constant dispersion over an extended wavelength range such as 1250 nm to 1600 nm.

In response to demands for specialized waveguide fibers, particularly with regard to high performance waveguides, investigation of waveguide core refractive index profiles has intensified. For example in U.S. Pat. No. 5,483,612, Gallagher et al., (the '612 patent) there is disclosed a core profile design which provides low polarization mode dispersion, low attenuation, a shifted dispersion zero, and low dispersion slope. Other core refractive index profiles have been designed to meet the requirements of applications which include the use of higher power signals or optical amplifiers.

A problem which may arise when a core profile is altered in order to arrive at a desired property is that the property is realized at the expense of another essential property. For example, a certain core refractive index profile design may provide increased effective area, thus reducing non-linear distortion of the signal. However, in this large effective area waveguide fiber, the bend resistance may be seriously compromised. Thus, core profile design is an exacting task, in which model studies usually precede the manufacturing stage of product development.

The interaction of the profile variables is such that one skilled in the art usually cannot, except perhaps in a very general way, predict the impact of a refractive index profile change upon such waveguide properties as, bend resistance, attenuation, zero dispersion wavelength, and total dispersion and total dispersion slope over a selected wavelength range. Therefore, studies of waveguide refractive index profiles usually include a computer simulation of the particular profile or family of profiles. Manufacturing testing is then carried out for those refractive index profiles which exhibited the desired properties.

In a continuation of the work disclosed in the '612 patent, a family of profiles was found which produced a high performance fiber having a zero dispersion wavelength above a pre-selected band of wavelengths and excellent bend resistance. A description of this work has been filed recently as a provisional application, Ser. No. 60/050550.

As further model studies and manufacturing tests were completed, it became clear that:
  a particular family of profiles could be found to provide a selected set of operating parameters; and, most surprisingly,
  the profiles of the particular family could be further adjusted to optimize attenuation without materially changing the operating parameters.

DEFINITIONS

The radii of the regions of the core are defined in terms of the index of refraction. A particular region has a first and a last refractive index point The radius from the waveguide centerline to the location of this first refractive index point is the inner radius of the core region or segment. Likewise, the radius from the waveguide centerline to the location of the last refractive index point is the outer radius of the core segment. Other definitions of core geometry may be conveniently used.

Unless specifically noted otherwise in the text, the parameters of the index profiles discussed here are defined as follows:
  radius of the central core region is measured from the axial centerline of the waveguide to the intersection with the x axis of the extrapolated central index profile;
  radius of the second annular region is measured from the axial centerline of the waveguide to the center of the baseline of the second annulus; and,
  the width of the second annular region is the distance between parallel lines drawn from the half refractive index points of the index profile to the waveguide radius.

The dimensions of the first annular region are determined by difference between the central region and second annular region dimensions.

Core refractive index profile is the term which describes the refractive index magnitude defined at every point along a selected radius or radius segment of an optical waveguide fiber.

A compound core refractive index profile describes a profile in which at least two distinct segments are demarcated.

The relative index percent ( $\Delta$ %) is:
  $\Delta \% = [(n_1^2 - n_c^2)/2n_1^2] \times 100$, where $n_1$ is a core index and $n_c$ is the minimum clad index. Unless otherwise stated, $n_1$ is the maximum refractive index in the core region characterized by a % $\Delta$.

The term alpha profile refers to a refractive index profile which follows the equation,
  $n(r) = n_0 (1 - \Delta[r/a]^\alpha)$ where r is radius, $\Delta$ is defined above, a is the last point in the profile, r is chosen to be zero at the first point of the profile, and I is a real number. For example, a triangular profile has $\alpha=1$, a parabolic profile has $\alpha=2$. When $\alpha$ is greater than about 6, the profile is essentially a step. Other index profiles include a step index, a trapezoidal index and a rounded step index, in which the rounding may be due to dopant diffusion in regions of rapid refractive index change.

The profile volume is defined as $2\int_{r_1}^{r_2} (\Delta \% \, r \, dr)$. The inner profile volume extends from the waveguide centerline, r=0, to the crossover radius. The outer profile volume extends from the cross over radius to the last point of the core. The units of the profile volume are % $\mu m^2$ because refractive index is dimensionless. To avoid confusion, the profile volumes will be connoted a number followed by the word units.

The crossover radius is found from the dependence of power distribution in the signal as signal wavelength changes. Over the inner volume, signal power decreases as wavelength increases. Over the outer volume, signal power increases as wavelength increases.

The bend resistance of a waveguide fiber is expressed as induced attenuation under prescribed test conditions. A bend test referenced herein is the pin array bend test which is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The bend test used in the model calculations was a single turn of waveguide fiber around a 30 mm diameter mandrel. The effective group refractive index ($n_{geff}$) is the ratio of the velocity of light to the group velocity. The mathematical expression for $n_{geff}$ in terms of electromagnetic field, refractive index, wavelength and propagation constant, derives from Maxwell's equations, or, more particularly, from the scalar wave equation.

The propagation constant $\beta$, also called the effective refractive index is an electromagnetic field parameter related to field propagation velocity and is found by solving the scalar wave equation for a selected waveguide. Because $\beta$ depends upon waveguide geometry, one may expect that bending the waveguide will change $\beta$. An example of a scalar wave equation descriptive of the electromagnetic fields which are supported by a particular waveguide geometry is found in "Optical and Quantum Electronics", J. P. Meunier et al., 15, (1983), pp. 77–85.

SUMMARY OF THE INVENTION

The present invention is therefore directed to an optical waveguide fiber having a core refractive index profile which produces a pre-selected set of operating properties and in which attenuation is optimized for that particular refractive index profile.

The novel core refractive index profile has a core region and a surrounding clad layer which together form a waveguide fiber. To confine light within the fiber, at least a portion of the core index profile must have a higher refractive index than at least a portion of the clad layer. Usually, the clad layer index profile is a single step, although useful designs which have a modified clad index have been made.

The core refractive index profile, defined above, is a refractive index value defined at each point along a specified portion of the waveguide radius. Thus the core index profile may be expressed as an index value n(r) at points along a radius beginning at 0, the center of the waveguide, and extending to a radius $r_o$. This core index is designed to produce a pre-selected set of waveguide fiber operating properties The operating properties each may have tolerance limits so that a family or set of core refractive profiles exists which produce these waveguide operating properties. Even in a model case, in which the operating properties each have a single value, a set or family of refractive index profiles which provide the properties can be found.

The set of core refractive index profiles, which provide the preselected waveguide operating parameters, may be specified by stating the amount of refractive index variation at any radial point r of the refractive index, $\delta n(r)$, and the amount of variation of the total radius, $\delta r_o$, which is allowable.

Through modeling studies of the family or set of allowable refractive index profiles, a subset of profiles have been found which have lower attenuation than the other members of the set. The waveguide properties which distinguish this highly preferred subset are the effective group refractive index, $n_{geff}$, and the propagation constant $\beta$. In particular, the highly preferred subset of lowest attenuation refractive index profiles have the lowest $n_{geff}$ of any other members of the set, and exhibit the smallest change in the square of the propagation constant, $\beta^2$, when the waveguide is bent. Any of a number of bending models can be used to calculate the bending induced change in $\beta^2$. A bending model used in the case described here is one in which the waveguide makes one turn around a 30 mm diameter mandrel.

The lowest attenuation refractive index profile family or set has been found for step index single mode waveguide fiber, trapezoidal shaped index, rounded step index, and compound index profiles made up of combinations of these. Thus it is believed to be very likely that essentially every family or set of profiles has members which exhibit lowest attenuation and that these members are characterized by the lowest $n_{geff}$ and lowest change in $\beta^2$ in bending as compared to any other member of the set or family of profiles.

Thus the core refractive index profile may have relative index differences, $\Delta$, which are positive or negative. The index profiles may have only one region of step, trapezoidal, rounded step, or $\alpha$-profile shape, in which $\alpha$ can assume any real number value. Alternatively, the core refractive index profile may be any combination or permutation of these shapes in two or more regions which are defined segments of the core region.

A particular compound core embodiment of the novel core refractive index profile is one in which N segments are defined. Each segment has a $\Delta$ % value and a shape. Various widths and radii (see the definitions section above) of the segments are defined until the complete geometry of the compound core has been specified. For example the outer radius, measured from the waveguide center to the outermost point of the particular core refractive index segment, of each segment may be specified. In general, the relative indexes, $\Delta$ %, for single mode waveguide fibers are in the range 0 to 3.5% and the outer radius of the outermost segment is in the range of 1 $\mu$m to 30 $\mu$m. A preferred band of operating wavelengths is 1200 nm to 1750 nm, which includes the operating windows near 1300 nm and 1550 nm.

An embodiment of the invention comprises a compound core having three segments. This embodiment is discussed in detail below. The model used to calculate waveguide fiber structure and properties can be adapted to account for a refractive index dip on centerline. In the case where there is some dopant depletion from the centerline, the lower limit of $\Delta_1$ % is decreased about 15%. Although dopant compensation can be made to eliminate centerline depletion, it is more time and cost efficient to adjust other profile parameters to compensate for the depletion. The definitions given above are followed in that $r_3$ is the radius drawn to the center of the base of the third segment and that $w_3$ is the width at the half relative index points of the third segment.

A preferred embodiment of the three segment core refractive profile is given in Table 1. The waveguide parameters in Table 1 provide the waveguide fiber properties set forth on Table 2.

A second preferred embodiment is given in Table 3. The waveguide fiber having parameters as set forth in Table 3 also give rise to waveguide fiber properties of Table 2.

DESCRIPTION OF THE PREFERRED EMBODIMENTS

Recent study of optical waveguide fiber core refractive index profiles has resulted in the description of a large number of core profiles which provide unique and advantageous waveguide properties. Examples are U.S. Pat. No. 4,715,679, Bhagavatula and U.S. Pat. No. 5,483,612, Gallagher in which the disclosed core index profiles were tailored to provide total dispersion, zero dispersion wavelength, and total dispersion slope which fit well with a particular fiber application. These investigations combined with additional work with various sets of refractive index profiles showed that it was possible to design waveguide fiber for very high performance systems. For example, waveguide fibers were developed which could accommodate telecommunication systems capable of high information transmission rates, using high power lasers, and optical amplifiers.

Researchers working with novel core index profiles, found that, in general a required set of waveguide functional properties could be provided by any of one or more sets of profile types. The decision as to which profile to use in the manufacturing process was driven by ease of manufacture, low cost, and insensitivity of the waveguide function to normal variations in waveguide manufacturing.

More recent work has shown that an additional factor must be included in evaluating which profile is best suited to the intended use and to low cost, high efficiency manufacturing. In particular, this recent work has served to identify sub-sets or sub-families of core index profiles which are unique in that they provide minimum attenuation compared to other members of the profile sets or families.

Experimentation with manufactured waveguides having core refractive index profiles in both the family and the low attenuation sub-family has shown that the attenuation difference is not due to manufacturing variability, Rayleigh scattering, or —OH content. The difference in attenuation between the profile set and the related profile sub-set stems from the details of the profile shape and so is termed "profile attenuation".

The novel feature of the core refractive profiles disclosed and described herein is that they are members of their respective minimum profile attenuation sub-sets.

Parametric modeling-studies and experimentation with manufactured waveguide fibers showed that profile attenuation is correlated with effective group refractive index, $n_{geff}$ and propagation constant $\beta$. More particularly, the studies showed that minimum profile attenuation waveguide fibers have minimum $n_{geff}$ and minimum change in $\beta^2$ in bending of the waveguide. This unexpected result provides another important tool in designing optimum core refractive index profiles for essentially all types of telecommunications uses.

Figure 1:
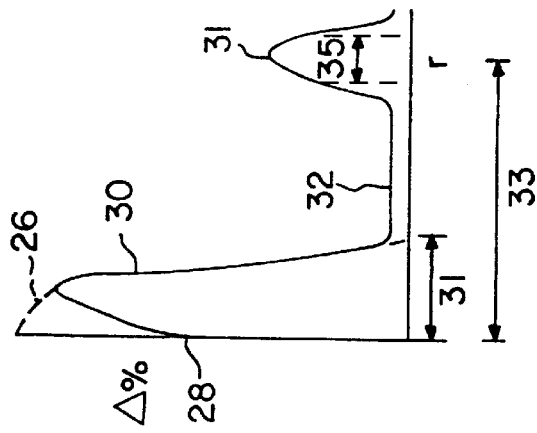
FIG. 1 is a general illustration of the various profile types.

The general type core refractive index profile of this invention is illustrated in FIG. 1. Note that the reference for the relative index is the clad layer index. The solid line index profile has a central point 24 of relatively low relative index percent, $\Delta$ %. The profile portion of higher $\Delta$ %, 6, may be, for example, an $\alpha$-profile or a rounded step profile. A flat portion of the profile, 14, is followed by another lower $\Delta$ % portion, 18, whose relative index is negative. Another $\alpha$-profile or rounded step profile region, for example, 20, follows region 18. The dots, 22, indicate the profile may include additional annular regions. Dashed lines 8 and 10 indicate alternative profile shapes close to the core center. Dashed line 2, a step index profile, is an alternative to the $\alpha$-profile shape 6. Dashed lines 12 and 16 show alternative profile shapes for the negative $\Delta$ % region of the profile.

FIG. 1 also shows the definitions of radii and width as the terms are used herein. Radius 3 of the center profile is the line which extends from the core centerline to the point at which the extrapolated profile 6 meets the x-axis. The radii of the annular regions surrounding the center profile are in general measured from the core center to the center of an annular region as illustrated by radius 7 of annulus 20. The width of an annular region is taken at the half $\Delta$ % points as illustrated by width 5 of annulus 20.

Figure 2:
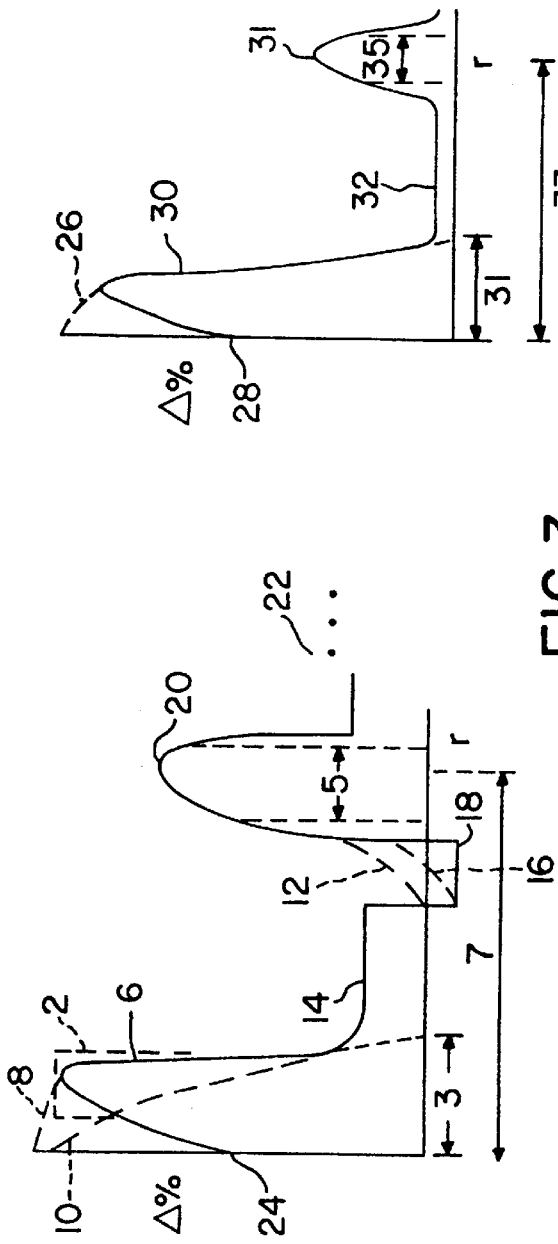
FIG. 2 is an illustration of the three segment compound core embodiment.

Extensive modeling studies as well as manufacturing studies were done on the profile illustrated in FIG. 2. Table 1 lists the parameters of the low attenuation subset of the profile in FIG. 2.

TABLE 1

| Parameter | Upper Limit | Lower Limit |
|---|---|---|
| $\Delta_1$% | 1.30 | 0.77 |
| $r_1$ (µm) | 3.41 | 2.04 |
| $\Delta_2$% | 0.16 | 0 |
| $\Delta_3$% | 0.51 | 0 |
| $r_3$ (µm) | 10.21 | 5.53 |
| $w_3$ (ρm) | 5.76 | 0 |
| Inner Profile Volume (% µm$^2$) | 3.62 | 2.67 |
| Outer Profile Volume (% µm$^2$) | 7.86 | 1.00 |

Figure 3:
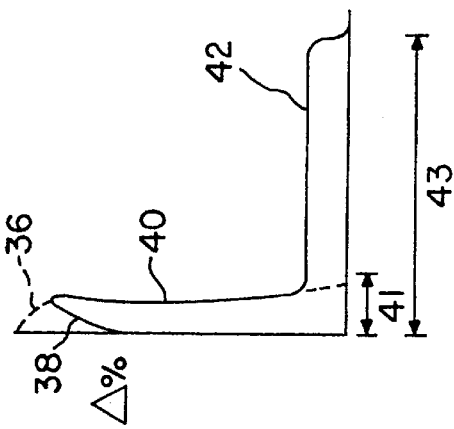
FIG. 3 is an illustration of the two segment compound core embodiment.

The cases where either $r_3$ or $w_3$ are zero are simply additional examples of optimum attenuation for the core refractive index illustrated in FIG. 3. The definitions of the parameters given in Table 1 are found in FIG. 2. The center $\alpha$-profile, having an $\alpha$ of 1 is shown as curve 30. The refractive index on the centerline, 28, is less than the maximum index of $\alpha$-profile 30. Dashed line 26 indicates that the profile can be modeled in cases where the maximum index lies on the waveguide centerline. The relative index of 30 is $\alpha_1$ % and the radius 31 is $r_1$. The relative index of region 32 is $\alpha_2$ %. The relative index of the rounded step 34 is $\alpha_3$ %, the radius 33 is $r_3$, and the width 35 is $w_3$. The core refractive index profiles having the parameters shown in Table 1, may produce the waveguide fiber functional properties given in Table 2. Over 700 core refractive index profiles taken from Table 1 were found to have the required functional properties stated in Table 2. It will be understood that not all combinations of Table 1 parameters will produce the functional properties stated in Table 2.

TABLE 2

| Waveguide Property | Upper Limit | Lower limit |
|---|---|---|
| Dispersion Zero (nm) | 1595 | 1575 |
| Dispersion Slope (ps/nm$^2$ - km) | 0.10 | — |
| Mode Field Diameter (nm) | 9.1 | 7.9 |
| Cut off Wavelength (nm) | 1500 | — |
| Pin Array Bend Loss (dB) | 8 | — |
| Att 1550 (dB/km) | 0.203 | — |

The waveguide properties shown in Table 2 are characteristic of a waveguide fiber for use in a multiplexed, high input power telecommunications system. This choice of example was made for convenience and in no way limits or defines the invention.

Another core refractive index profile shape was modeled to find parameter limits which would provide the waveguide properties given in Table 2. This second core refractive index shape is shown in FIG. 3. Again we choose to use the center profile shape in which centerline index 38 is less than the maximum index of α-profile 40, where α=1. Dashed line 36 indicates that the profile may be modeled without the lower refractive index on centerline The core refractive index profile shown in FIG. 2 has two segments. The center segment 40 has relative index $\Delta_1$ % and radius 41, designated $r_1$ in Table 3. The step portion of the index profile, 42, has radius 43, designated $r_2$ in Table 3. The relative index of segment 42 is $\alpha_2$ %. Note that the outer end point of $r_2$ is found by extrapolating the descending portion of segment 42 to the horizontal or x-axis.

TABLE 3

| Parameter | Upper Limit | Lower Limit |
|---|---|---|
| $\Delta_1$% | 1.25 | 1.02 |
| $r_1$ | 2.38 | 1.84 |
| $\Delta_2$% | 0.10 | 0.03 |
| $r_2$ | 10.54 | 6.50 |
| Inner Profile Volume % $\mu m^2$ | 3.35 | 2.76 |
| Outer Profile Volume % $\mu m^2$ | 7.77 | 2.24 |

All possible combinations of the parameters in Table 3 do not provide waveguides having the properties given in Table 2. However, in the model study over 200 refractive index profiles which were combinations of the Table 3 parameters did provide a waveguide having properties in the ranges shown in Table 2. The FIG. 2 index profiles in general produced lower dispersion slope, an average of about 0.01 ps/nm²-km lower, than the profiles exemplified by FIG.3.

Figure 4:
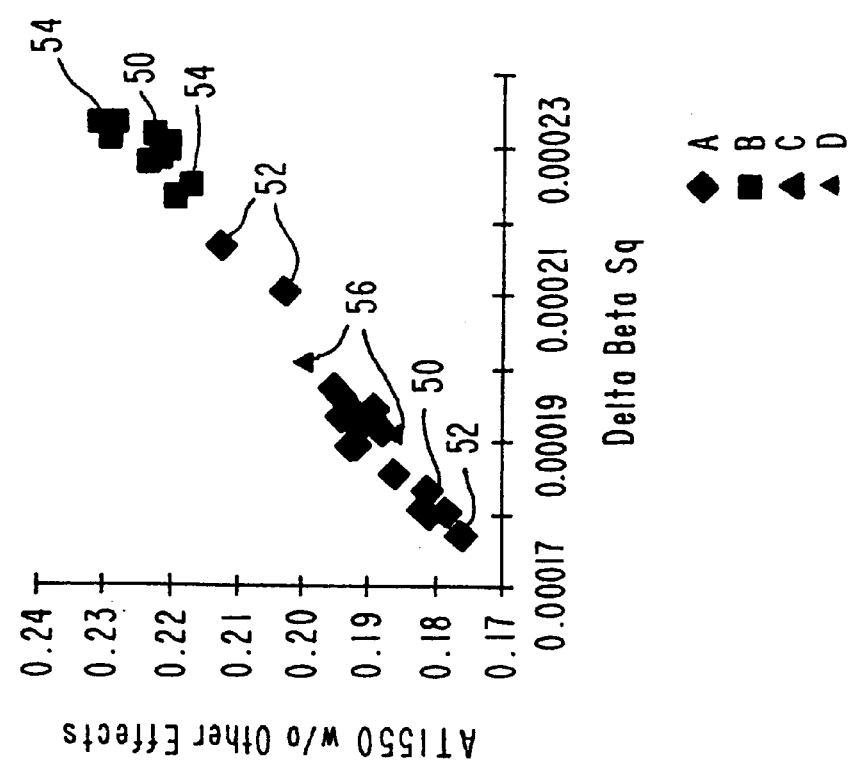
FIG. 4 is a chart of attenuation at 1550 nm versus effective group index.
Figure 5:
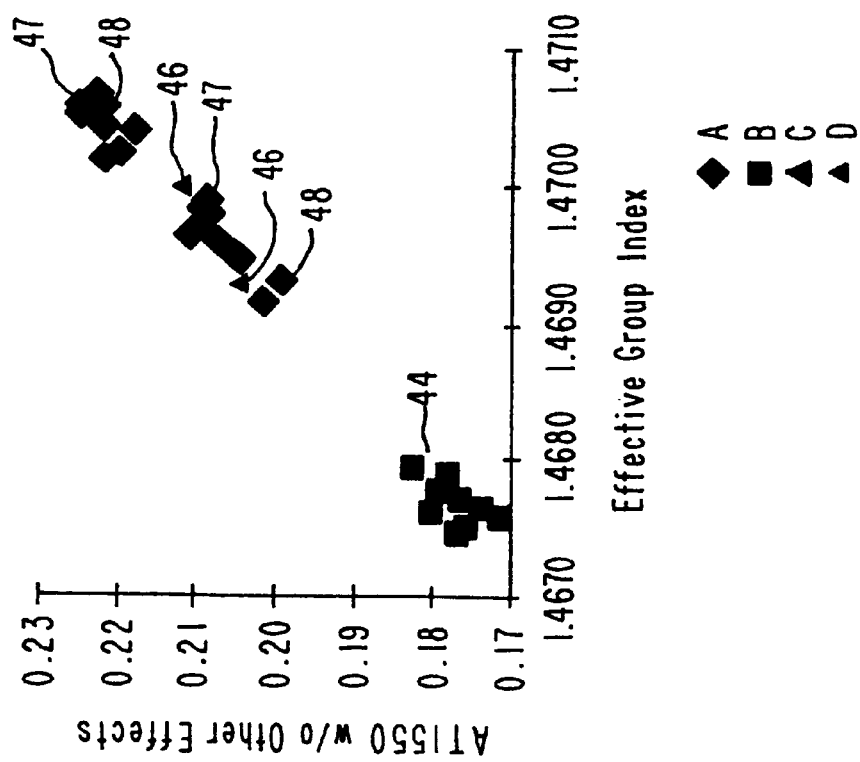
FIG. 5 is a chart of attenuation at 1550 nm versus the bend induced change in $\beta^2$.

Experimental results from attenuation measurements on waveguides having four distinct profile types are shown in FIGS. 4 and 5. Waveguide fiber types A, C, and D are variations on the profile shown in FIG. 2. All are dispersion shifted single mode waveguide fiber. The type A waveguide is further characterized in Table 1. Waveguide fiber B is a step index single mode waveguide fiber.

In FIG. 4, the attenuation at 1550 nm is charted versus the effective group index, $n_{geff}$, of each of the waveguides. The process was carefully controlled to remove any data scatter due to manufacturing variables. Data scatter due to —OH content effects and Rayleigh scattering were also removed. Thus, the clusters of points for each waveguide type show the change in attenuation due to a change in the index profile which is manifested as a change in the effective group index. The step index waveguides B, dark squares 44, show a profile attenuation variation of about 0.013 dB/km for the change in $n_{geff}$ shown. Likewise the A waveguides, dark diamonds 48, show a 0.02 dB/km change, the C waveguides, dark triangles 46, show a 0.015 dB/km change, and the D waveguides, light triangles 47, show about a 0.017 dB/km change in attenuation.

FIG. 5 shows the same data except that the change in attenuation is charted versus change in $\beta^2$ induced by making a single turn of the waveguide about a 30 mm mandrel. Here the B step index waveguides, dark squares 54, show about the same change as before. The A type waveguides, having a profile similar to that of FIG. 2, dark diamonds 52, show a much higher change in attenuation with bending change in $\beta^2$ than do the other FIG. 2 type profiles, i.e. C type, dark triangles 56, and D type, light triangles 50.

The major finding of the experimental data set forth in FIGS. 4 and 5 is that:
  profile attenuation occurs for widely different profile shapes; and,
  profile attenuation is closely related to $n_{geff}$ and change in $\beta^2$ with bending.

Based in these results, one is led to the conclusion that profile attenuation is essentially a universal phenomenon.

EXAMPLES

Manufactured Waveguides of the Type Illustrated in FIG. 2

Two distinct draw preforms were made in accordance with the core refractive index profile shown in FIG. 2. The parameters of the two profiles are set forth in Table 4.

TABLE 4

| Parameter | Draw Preform #1 | Draw Preform #2 |
|---|---|---|
| $\Delta_1$% | 0.868 | 0.864 |
| $r_1$ (nm) | 2.773 | 2.781 |
| $\Delta_2$% | 0.023 | 0.025 |
| $\Delta_3$% | 0.258 | 0.216 |
| $r_3$ (nm) | 6.71 | 7.51 |
| $w_3$ (nm) | 0.67 | 0.64 |
| Inner Volume (% $\mu m^2$) | 3.02 | 3.08 |
| Outer Volume (% $\mu m^2$) | 3.90 | 4.01 |

The optical properties of the waveguides produced from these draws preforms were well within the specified limits as shown in Table 3. Some of the waveguide measurements are shown in Table 5. Note the very low attenuation in both the 1310 nm and the 1550 nm operating windows. These waveguides are thus in the subset of low profile attenuation waveguides.

TABLE 5

| Waveguide Properties | Draw Preform #1 | Draw Preform #2 |
|---|---|---|
| Dispersion Zero (nm) | 1582.5 | 1584.5 |
| Dispersion Slope (ps/nm²-km) | 0.077 | 0.073 |
| Mode Field Diameter (nm) | 8.34 | 8.22 |
| Cut Off Wavelength (nm) | 1186 | 1190 |
| Att 1310 nm (dB/km) | 0.371 | 0.372 |
| Att 1550 nm (dB/km) | 0.199 | 0.201 |

These results clearly demonstrate the accuracy and integrity of the model and the excellent reproducibility of the process. The existence of a low profile attenuation sub-set had been established and a means to manufacture waveguides which lie in the sub-set have been set forth.

Although particular embodiments of the invention have herein been disclosed and described, the invention is nonetheless limited only by the following claims.

We claim:

1. A single mode optical waveguide fiber optimized to have low attenuation comprising:
   a core glass region having a refractive index profile;
   an annular clad glass layer surrounding and in contact with the core glass region, the clad glass layer having a refractive index profile, wherein at least a portion of the core index profile is greater than at least a portion of the clad layer index profile; wherein, said core region includes, a center segment having an outer radius $r_1$, a relative index $\Delta_1\%$, and a centerline having a relative index, a first annular segment, surrounding and in contact with the center segment, having a relative index $\Delta_2\%$, and, a second annular segment, surrounding and in contact with the first annular segment, having a center radius $r_3$, a relative index $\Delta_3\%$, and a width $w_3$;

wherein, $\Delta_1\% > \Delta_3\% \geq \Delta_2\% \geq 0$; and $\Delta_1\%$ is in the range 0.77% to 1.30%, $r_1$ is in the range 2.04 μm to 3.41 μm, $\Delta_2\%$ is in the range 0 to 0.16%, $\Delta_3\%$ is in the range 0 to 0.51%, $r_3$ is in the range 5.53 μm to 10.21 μm, and $w_3$ is in the range 0 to 5.76 μm.

2. The single mode waveguide of claim 1 wherein total dispersion slope $\leq 0.10$ ps/nm$^2$-km, diameter in the range 7.9 μm to 9.1 μm and cut off wavelength $\leq 1500$ nm.

3. The single mode waveguide of claim 2 wherein mode field diameter >7.9 μm.

4. The single mode waveguide of claim 3 wherein said single mode waveguide is characterized by induced attenuation under pin array bending conditions and the pin array bending induced attenuation is less than or equal to 8 dB.

5. The single mode waveguide of claim 4 wherein zero dispersion wavelength is in the range of 1575 nm to 1595 nm.

6. The single mode waveguide of claim 2 further characterized by an inner and an outer profile volume wherein the inner volume is about 3.02 units and the outer volume is about 3.9 units; and wherein, the combinations of profile parameters selected from the prescribed ranges provide a single mode waveguide having attenuation at 1550 nm less than or equal to 0.19 dB/km.

7. The single mode waveguide of claim 1 further characterized by an inner and an outer profile volume wherein the inner volume is in the range 2.67 units to 3.62 units and the outer volume is in the range 1.00 units to 7.85 units; and wherein, the combinations of profile parameters selected from the prescribed ranges provide a single mode waveguide having attenuation at 1550 μm less than or equal to 0.203 dB/km.

8. A single mode optical waveguide fiber optimized to have low attenuation comprising:

a core glass region having a refractive index profile;

* * * * *

UNITED STATES PATENT AND TRADEMARK OFFICE
CERTIFICATE OF CORRECTION

PATENT NO.     : 6,282,354 B1
DATED          : August 28, 2001
INVENTOR(S)    : Peter C. Jones, Daiping Ma and David K. Smith It is certified that error appears in the above-identified patent and that said Letters Patent is hereby corrected as shown below:

<u>Column 10,</u>
Line 22, the remainder of claim 8 is missing. After the words "refractive index profile;" please insert the following:
-- an annular clad glass layer surrounding and in contact with the core glass region, the clad glass layer having a refractive index profile, wherein at least a portion of the core index profile is greater than at least a portion of the clad layer index profile; wherein, said core region includes, a center segment having an outer radius $r_1$, a relative index $\Delta_1\%$, and a centerline having a relative index, a first annular segment, surrounding and in contact with the center segment, having a relative index $\Delta_2\%$, and, a second annular segment, surrounding and in contact with the first annular segment, having a center radius $r_3$, a relative index $\Delta_3\%$, and a width $w_3$;

wherein,
$\Delta_1\% > \Delta_3\% \geq \Delta_2\% \geq 0$;

wherein the refractive index profile is selected to result in a fiber which exhibits the following properties:

zero dispersion wavelength in the range 1575 nm to 1595 nm, total dispersion slope $\leq 0.10$ ps/nm$^2$-km, mode field diameter in the range 7.9 $\mu$m to 9.1 $\mu$m, cut off wavelength $\leq 1500$ nm, and pin array bending induced attenuation is less than or equal to 8 dB. --

Signed and Sealed this

Eighteenth Day of June, 2002

*Attest:*

*Attesting Officer*

JAMES E. ROGAN
*Director of the United States Patent and Trademark Office*